United States Patent
Impiö

(10) Patent No.: US 6,559,828 B1
(45) Date of Patent: May 6, 2003

(54) USER INTERFACE FOR SELECTING FUNCTIONS IN AN ELECTRONIC HARDWARE

(75) Inventor: Jussi Markus Impiö, Rovaniemi (FI)

(73) Assignee: Clothing Plus Oy, Tampere (FI)

( * ) Notice: Subject to any disclaimer, the term of this patent is extended or adjusted under 35 U.S.C. 154(b) by 0 days.

(21) Appl. No.: 09/495,949

(22) Filed: Feb. 2, 2000

(30) Foreign Application Priority Data

Aug. 13, 1999 (FI) ............................................. 19991722

(51) Int. Cl.⁷ ................................................. G09G 5/00
(52) U.S. Cl. ........................ 345/156; 345/158; 345/863
(58) Field of Search ................................. 345/156–167, 345/179, 863

(56) References Cited

U.S. PATENT DOCUMENTS

| | | | | |
|---|---|---|---|---|
| 4,988,981 A | * | 1/1991 | Zimmerman et al. ....... | 345/158 |
| 5,441,047 A | * | 8/1995 | David et al. ................ | 600/483 |
| 5,999,167 A | * | 12/1999 | Marsh et al. ............... | 345/158 |
| 6,043,805 A | * | 3/2000 | Hsieh .......................... | 345/158 |
| 6,088,021 A | * | 7/2000 | Young ......................... | 345/163 |
| 6,191,773 B1 | * | 2/2001 | Maruno et al. ............. | 345/158 |

FOREIGN PATENT DOCUMENTS

| | | |
|---|---|---|
| EP | 516862 A1 | 9/1992 |
| EP | 0 825 514 | 2/1998 |
| FI | 50573 | 12/1975 |
| JP | 10260770 A | 9/1998 |
| JP | 10-260770 | * 9/1998 |

* cited by examiner

*Primary Examiner*—Steven Saras
*Assistant Examiner*—Amr Awad
(74) *Attorney, Agent, or Firm*—Burns, Doane, Swecker & Mathis, LLP

(57) ABSTRACT

The invention relates to a user interface in an electronic hardware arrangement, with an operating device for starting the desired function. The operating device has a fixing point, from which its distance can be adjusted, and means for defining said distance. The function to be performed in each case depends on the defined distance. The invention can be used for instance in portable computers.

18 Claims, 2 Drawing Sheets

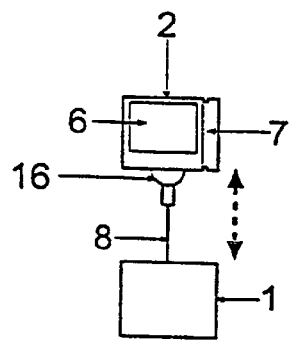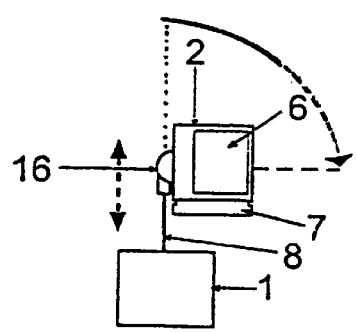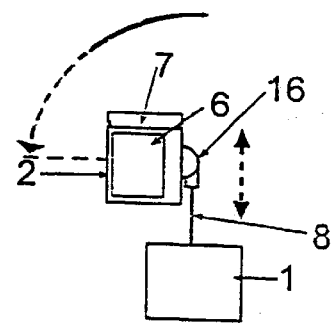
Fig. 3 a                Fig. 3 b                Fig. 3 c
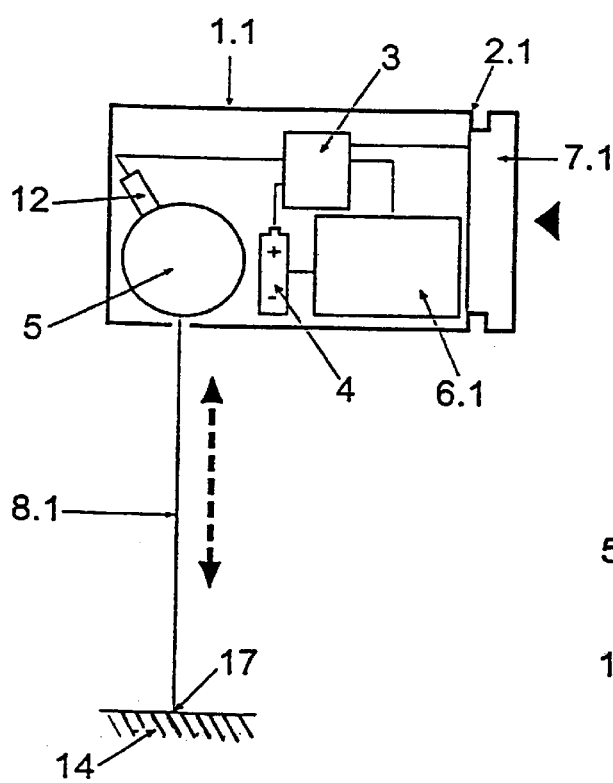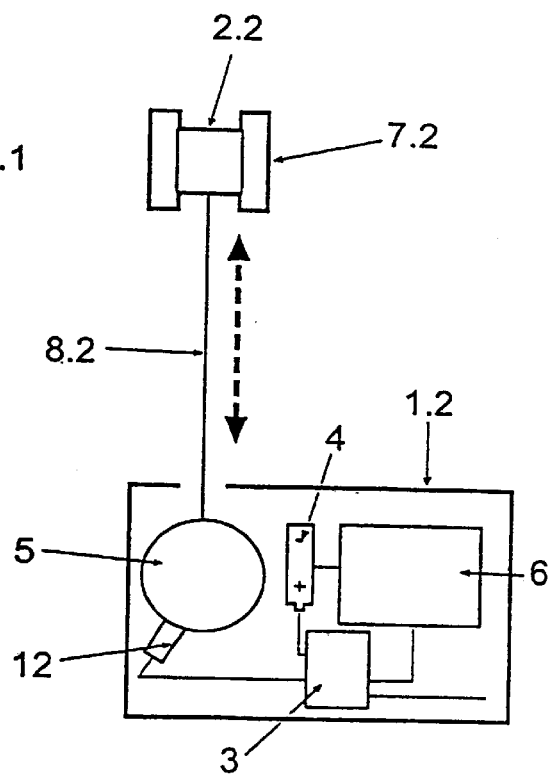
Fig. 4                                Fig. 5

USER INTERFACE FOR SELECTING FUNCTIONS IN AN ELECTRONIC HARDWARE

FIELD OF THE INVENTION

The invention belongs to the field of controlling electronic hardware arrangements and relates to a user interface of an electronic arrangement, whereby said arrangement can be controlled. In particular, the invention can be employed in applications where the use of a keyboard is cumbersome or impossible. One application for the invention are data processing devices, such as portable computers.

DESCRIPTION OF THE PRIOR ART

A computer is usually controlled by means of a keyboard. The number of required keys is normally fairly large. In order to press the keys, there are needed free fingers or a pin of some kind. A computer can be controlled by means of so-called menus, where the operative alternatives available in each situation are represented at various locations on the display screen. The desired function is selected by shifting the cursor on the screen to the function in question, and started by pressing the enter key.

Another generally used computer operating device is a so-called mouse; by moving the mouse two-dimensionally, the cursor is shifted on the display screen. The mouse is used for selecting the desired function in a menu. The mouse may have one or more buttons, by which functions are be started. The use of a mouse is restricted by the fact that a fairly large even surface is needed.

In the patent publication FI-C-50,573, there is introduced a device for feeding digitised information, comprising a feed member to be moved back and forth in one direction. According to the movements of the feed member, the reading on the display screen is increased or reduced, and when the desired reading on the screen is achieved, a feed button is pressed in order to feed said reading.

The patent application EP-A-825,514 introduces a user interface which is turned in different positions, and by said turns, the cursor is moved on the display screen. This device is based on acceleration transducers.

GENERAL DESCRIPTION OF THE INVENTION

We have now invented, according to the independent claims, a user interface, an electronic hardware arrangement, a control system for said arrangement and the use of them in clothing. The independent claims disclose some of the preferred embodiments of the invention.

According to the invention, the arrangement includes an operating device, the distance of which from a fixing point can be adjusted, said distance defining the function to be performed by means of the arrangement. In order to define the distance, the apparatus is provided with suitable means, such as a cord and means for measuring the length thereof, or a radio transmitter and receiver, whereby the distance can be defined. The cord can be for instance ribbon-like. The cord can also be a cable with conductors for transmitting signals.

The electronic arrangement includes a processor where the desired functions are programmed, and the required auxiliary devices. In particular, the arrangement can be a computer.

The operating device can move in a stepped fashion, and it may include means for indicating the number of steps taken.

The apparatus may also be such that at a given distance, several different functions are available, and the desired function is selected by turning the operating device. Thus also a two-dimensionally operated, mouse-like device can be created.

When the operating device is attached by means of cord, the cord can be wound on a coil, in which case the coil may include a system for measuring the rotary motion of the coil, and the distance is defined according to said system. The fixing point of the operating device can be located near the user, for example in his/her clothing, or apart from the user. The arrangement may include a separate electronics unit, to which the operating device is attached, or the electronics unit may be totally or partly integrated as one and the same unit with the operating device.

The device can be programmed to function so that the user may select a basic location from which the distance is measured. Thus the operating device can in the rest position be in a suitable storage location, for instance in the user's clothing. When implemented, it is brought to a suitable position, for example at a distance of a suitably bent arm. Said location can be locked as the basic location, from which the distance is measured. As an alternative, the distance can be measured directly from the storage location.

The operating device can include one or several press keys in order to start the function available, or the system can be programmed to automatically perform the selected function by changing the distance. Most suitably the size of the operating device is such that the device fits in the hand, and its shape is such that it can be handled with a gloved hand, without having to use separate fingers. The number of press keys is preferably one, and it is preferably of a type that functions by pressing the hand together. The press key may have two or more positions that can be used for starting different functions.

The arrangement may include a radio device for transmitting or receiving messages. By means of the radio device, the arrangement can be connected for instance to a position finding system.

The apparatus may also include sensors in order to observe the conditions of the surroundings or of the user.

The apparatus may be provided with a detector in order to indicate the function that is being performed, in order to indicate the results of the performed function, to express a message received by a possible radio device or in order to express a signal obtained by possible sensors, or data processed on the basis of a signal. In particular, the detector can be a display or sound device. By means of a display device, the available functions can be represented as a menu, which is then browsed by adjusting the distance of the operating device. The arrangement may also include a light signal.

The invention is suited to be used particularly in applications where it is necessary to operate a computer with one hand only, or without a keyboard. One target application are so-called portable computers, in which case the user can use his/hers other hand for other purposes. The operating device can also be made such that it can be used even with thick gloves on. One user group are people who—owing to an illness or handicap, for instance—cannot handle ordinary operating devices provided with keys.

DRAWINGS

The appended drawings form part of the written description of the invention.

FIG. 1 is a diagrammatic illustration of a data processing arrangement according to the invention and of the operating device thereof, provided with a display screen;

FIGS. 2a . . . 2c illustrate the use of the arrangement according to FIG. 1 as attached to clothing, in various positions;

FIGS. 3a . . . 3c illustrate another data processing arrangement according to the invention and its operating device, which can also be turned in order to control the arrangement;

FIG. 4 illustrates a third data processing arrangement, where the computer unit and the operating device are combined;

FIG. 5 illustrates a fourth data processing arrangement according to the invention, where the display screen is arranged in the computer unit.

DETAILED DESCRIPTION OF SOME PREFERRED EMBODIMENTS OF THE INVENTION

Figure 1:
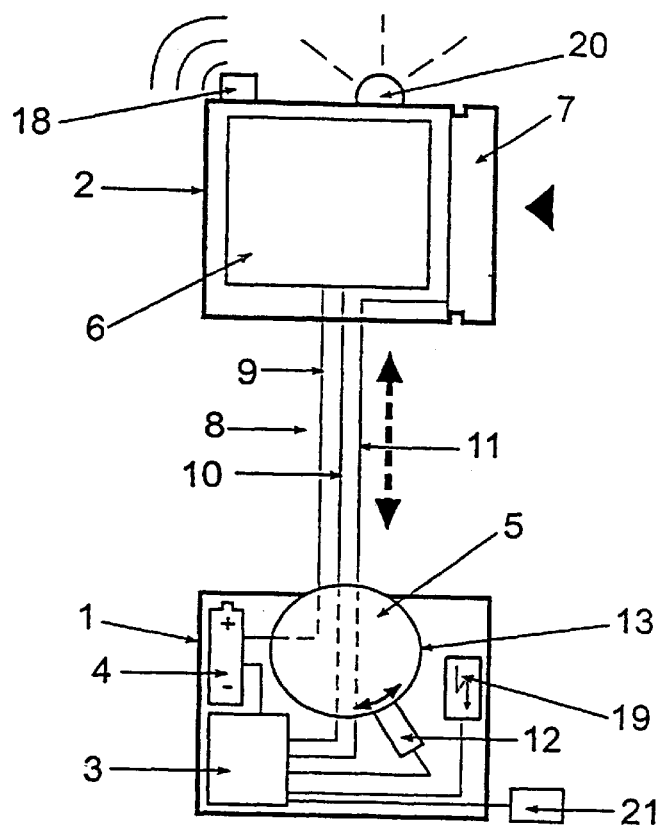

The arrangement according to FIG. 1 comprises a computer unit 1 and a connected mobile operating device 2. The computer unit includes a processor 3, a power source 4 and a spring-loaded coil 5. The operating device comprises a display 6 and a press key 7 for controlling the computer. On the coil, there is wound a cable 8, the other end whereof is attached to the coil and the other end to the operating device. The cable is provided with wires for the connections required by the display and the computer, for example a current wire 9, a display signal wire 10 and key signal wires 11. From the coil, the wires are connected by sliding switches to wires leading to the power source and the processor. The coil also includes a revolution counter 12, which is connected to the processor. The processor registers at suitable steps, for instance after every complete revolution, the rotary motion of the coil and at the same time the stepwise measured distance of the operating device from the computer unit.

In the processor, there are programmed various functions to be performed by selection of the user. The functions available in each situation are seen as a menu on the display screen. The menu can be browsed by adjusting, step by step, the distance of the operating device 2 from the computer unit 1. When the desired function is selected, it can be started by pressing the key 7.

A first compression of the function key 7 starts the computer unit 1, and the starting menu appears on the display 6. The distance of the operating device 2 from the computer unit 1 at the starting moment is registered as the initial distance, and the menu is browsed by changing said distance. When the desired function is selected, it is started by pressing the key 7. If the function is ready to be performed, it is run and the result is shown on the display screen. As an alternative, a new menu opens up, or there appears for example a notice of erroneous operation.

The distance of the operating device 2 when browsing the menu can be set as increasing or diminishing. When using successive menus, it should be taken into account that the trajectory in the opposite direction should not become too long with respect to a normal initial distance. The apparatus may also be provided with a function for adjusting the initial distance during usage.

The coil 5 can be provided with a mechanical, motion-resistive step counter 13, such as a ratchet brake or the like, whereby the user always feels it when the operating device 2 has been shifted for the distance of one step. Said counter may include a sound signal, for instance a mechanically created sound signal.

By means of the step counter 13, the arrangement can be used even without looking at the display 6.

Figure 2:
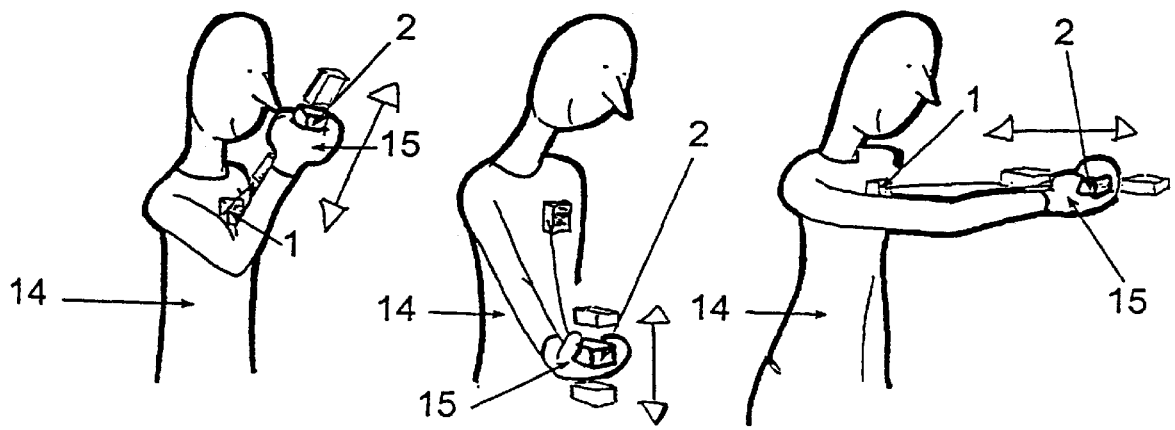

The computer unit 1 can be for instance of a type that is attached to clothing 14 (FIGS. 2a . . . 2c), in which case the operating device 2 can be held in hand. The initial distance is chosen to be suitable with respect to the user's size and position of usage. A suitable initial distance is for instance the distance of a half-bent arm. The arrangement can be controlled by one hand and in a number of very different positions. When the operating device is not needed, it can be attached to the computer unit, so that both hands are free.

The operating device 2 is of a size that suitably fits in the hand. The select key 7 is located at the side of the operating device, and it is pushed by pressing the hand.

The select key 7 is sufficiently large in order to be used reliably even with thick gloves 15. Respectively, the distance moved by the key is sufficiently long, in order to prevent a situation where it is too easily pressed by accident. Thus the arrangement is suitable to be used for example with thick sports or working gloves.

The length of the key in the transversal direction of the hand is for instance 3 . . . 10 cm. The length of the impression is for instance 0.5 . . . 2 cm. In an extreme situation, the arrangement can be operated even without hands.

More degrees of freedom are gained by connecting in the operating device 2 a turning sensor 16 (FIGS. 3a . . . 3c). Now, according to the position of the turning sensor, there can be provided more menus to be opened on the basis of the position of the turning sensor. The number of positions that are deviated from the basic position by turning is for example two, i.e. about 90° to the left and to the right. Most suitably the turning sensor is operated mechanically, and a detector of the turning position is provided therein.

The turning sensor 16 may also have several positions, even almost continuously. Respectively, also the distance can be measured in very short steps, in which case there is obtained a two-dimensional control device corresponding to a mouse.

The arrangement according to FIG. 4 comprises a mobile computer unit 1.1, in connection to which there is provided an operating device 2.1 with a select key 7.1 and a display screen 6.1. The far end of the fastening cord 8.1 connected to the coil is attached at a suitable fixing point 17, such as to the user's clothing 14. The arrangement functions in similar fashion as the one illustrated in FIG. 1.

The display screen may also be totally separate from the computer unit and the operating device, for example attached to the user's helmet, so that it can be observed when desired.

The arrangement according to FIG. 5 includes a stationary computer unit 1.2, in connection to which there also is provided a display screen 6.1. The select key 7.2. is arranged in the operating device 2.2, which is connected to the coil 5 by means of a cord 8.2. The arrangement functions in a similar fashion as the one illustrated in FIG. 1.

The arrangement may include for instance a buzzer 18 provided in the operating device in order to give a sound signal (cf. FIG. 1). By means of the buzzer, it is for instance possible to express the motions made by the operating device 2, 2.1, 2.2, to report that a function has been performed or to give a notice of error.

The arrangement may also include a radio device 19 (cf. FIG. 1), whereby messages can be received or transmitted. Thus it is possible to be in contact for example with other similar devices, telecommunication networks or positioning systems (such as GPS). This type of a device is suited to be used particularly by people who move off the road, for example in camping, search, rescue, building and military purposes. By means of the apparatus, it is possible to obtain for instance weather forecasts, exact locations, information of the covered route, advice for route planning or advice for taking care of certain special situations. The arrangement can also be used for sending or receiving alarm messages etc. The arrangement may also include a telephone. By using the buzzer 18, the performed radio traffic can be reported.

The arrangement may also include a light signal (cf. FIG. 1), which can be used as an alarm signal, when the arrangement is not properly in operation. By means of said light signal, it is possible to for example report that a messages is received, or to remind of a point of time when a given task should be performed.

Even without radio connections, the arrangement is suited to be used particularly as a personal data and control arrangement for people who work in maintenance or repairs. One user group is divers.

The computer unit 1, 1.1, 1.2 can also be provided with one or several sensors 21 (cf. FIG. 1) in order to survey the state of the surroundings or of the user. Sensors can be employed for observing the physiological condition of the person, such as measuring the body temperature, pulse or blood sugar level. The person can himself check the readings and act accordingly or ask advice. The arrangement may include pre-registered advice in case of certain situations, or advice can be asked from outside by means of a radio device. The arrangement can be programmed to give alarm on the display screen 6, 6.1, with the buzzer 18 or with a light signal 20, if the condition of the person requires active measures. The arrangement can also include an automatic function for sending an alarm message in case the person is incapable of acting correctly or acting at all (for example in the case of hypothermia). The arrangement, provided with sensors, is suited for instance for people who travel off the road in extreme conditions, for sportsmen and for people who have a serious disease.

What is claimed is:

1. A user interface for an electronic hardware arrangement, by means of which electronic hardware arrangement various selected functions can be performed, said user interface comprising:
   an operating device to start the desired function,
   the operating device has a fixing point, with respect to which point a distance between the operating device and the fixing point can be adjusted;
   a cord connected to the operating device and the fixing point;
   means for defining the distance of the operating device along the cord from the fixing point, and
   the function available in each case depends on the defined distance of the operating device,
   wherein the fixing point is affixed to a piece of clothing.

2. A piece of clothing in combination with a computer having a user interface according to claim 1, wherein the fixing point is affixed to the piece of clothing.

3. An electronic arrangement, whereby various functions can be selected, said arrangement comprising an operating device for starting the desired function, wherein
   the operating device is fastened to a fixing point by means of a cord,
   wherein the fixing point is affixed to a piece of clothing,
   the distance of the operating device from the fixing point, as measured along the cord, is adjustable,
   the arrangement includes means for defining said distance from the fixing point along the cord, and
   the function to be performed at each point of time depends on the defined distance of the operating device,
   said arrangement comprising an electronics unit, whereto the operating device is attached by means of a cable for transmitting signals.

4. An arrangement according to claim 3, said operating device being provided with a press key in order to start the desired function.

5. An arrangement according to claim 3, comprising a radio device for receiving or transmitting a message from or to a device external to the arrangement.

6. An arrangement according to claim 5, connected to a positioning system by means of a radio device.

7. An arrangement according to claim 3, provided with sensors in order to observe the state of the surroundings or of the user.

8. An arrangement according to claim 3, provided with an indicator in order to indicate the available functions, to give results of performed functions, to express messages received by means of a radio device, or to express signals received by sensors or data processed in a computer on the basis of said signals.

9. An arrangement according to claim 3, comprising means for defining the distance from the fixing point in a stepped fashion.

10. An arrangement according to claim 3, wherein at a given distance of the operating device there are several functions available.

11. An arrangement according to claim 3, wherein the cord is wound on a coil.

12. An arrangement according to claim 11, wherein the coil comprises a system for measuring the rotary motion of the coil.

13. An arrangement according to claim 3, wherein the fixing point is located in the clothing of the user.

14. An arrangement according to claim 3, wherein the user may select a basic location from which the distance is measured.

15. A piece of clothing in combination with a computer having a user interface according to claim 3, wherein the fixing point is affixed to the piece of clothing.

16. An electronic arrangement according to claim 3, wherein a single cord is connected between the operating device and the fixing point.

17. An arrangement for controlling an electronic arrangement, wherein
   available functions are shown as a menu on a display screen,
   a movable operating device is connected to the electronic arrangement, and by moving said operating device one of the available functions is chosen to be performed,
   the operating device is fastened by cord to a fixing point, so that a distance between the operating device and the fixing point can be adjusted,
   the arrangement comprises means for defining the distance of the operating device from the fixing point, measured along the cord, and
   the function to be performed in each case depends on the defined distance of the operating device.

18. A piece of clothing in combination with a computer provided with a control system according to claim 17, wherein the electronic arrangement has a fixing point affixed to the piece of clothing, and wherein the movable operating device is connected to the electronic arrangement by a cord.

* * * * *